United States Patent
Shah

(10) Patent No.: US 8,489,777 B2
(45) Date of Patent: Jul. 16, 2013

(54) SERVER FOR PRESENTING INTERACTIVE CONTENT SYNCHRONIZED TO TIME-BASED MEDIA

(75) Inventor: Ajay Shah, Orange, CA (US)

(73) Assignee: Spot411 Technologies, Inc., Orange, CA (US)

( * ) Notice: Subject to any disclaimer, the term of this patent is extended or adjusted under 35 U.S.C. 154(b) by 0 days.

(21) Appl. No.: 13/097,768

(22) Filed: Apr. 29, 2011

(65) Prior Publication Data

US 2011/0209189 A1    Aug. 25, 2011

Related U.S. Application Data

(63) Continuation of application No. 12/837,842, filed on Jul. 16, 2010, which is a continuation-in-part of application No. 12/789,377, filed on May 27, 2010.

(60) Provisional application No. 61/181,472, filed on May 27, 2009.

(51) Int. Cl.
*G06F 15/16*    (2006.01)

(52) U.S. Cl.
USPC .......................................... 709/248; 709/203

(58) Field of Classification Search
USPC .................................. 709/203, 248
See application file for complete search history.

(56) References Cited

U.S. PATENT DOCUMENTS

| | | |
|---|---|---|
| 6,209,028 B1 | 3/2001 | Walker et al. |
| RE37,131 E | 4/2001 | Mankovitz |
| 6,263,505 B1 | 7/2001 | Walker et al. |
| 6,453,252 B1 | 9/2002 | Laroche |
| 6,738,803 B1 | 5/2004 | Dodrill et al. |
| 6,834,308 B1 | 12/2004 | Ikezoye et al. |
| 6,947,966 B1 | 9/2005 | Oko, Jr. et al. |
| 6,990,453 B2 | 1/2006 | Wang et al. |
| 7,013,301 B2 | 3/2006 | Holm et al. |
| 7,325,013 B2 | 1/2008 | Caruso |
| 7,346,512 B2 | 3/2008 | Wang et al. |
| 7,349,552 B2 | 3/2008 | Levy et al. |
| 7,352,958 B2 | 4/2008 | Ando et al. |
| 7,359,889 B2 | 4/2008 | Wang et al. |
| 7,421,376 B1 | 9/2008 | Caruso et al. |
| 7,423,983 B1 | 9/2008 | Li et al. |

(Continued)

FOREIGN PATENT DOCUMENTS

| | | |
|---|---|---|
| WO | WO-2010138776 A1 | 12/2010 |
| WO | WO-2010138776 A2 | 12/2010 |
| WO | WO-2010138776 A3 | 2/2011 |

OTHER PUBLICATIONS

Ke, Yan et al., "Computer Vision for Music Identification", School of Computer Science, Carnegie Mellon, Intel Research, Pittsburgh {yke,dhoiem,rahuls}@cs.cmu.edu http://www.cs.cmu.edu/~yke/musicretrieval/ Mar. 2005 , all.

(Continued)

*Primary Examiner* — Liangche A Wang
(74) *Attorney, Agent, or Firm* — Strategic Patents, P.C.

(57) ABSTRACT

Where multiple client devices are synchronized to multiple, asynchronous instances of a time-based media presentation such as live and time-shifted views of a television broadcast, interactive content can be delivered to each one of the various devices at a particular time (or "time offset") within the presentation independent of when each instance of the time-based media presentation is viewed.

19 Claims, 10 Drawing Sheets

U.S. PATENT DOCUMENTS

| | | | |
|---|---|---|---|
| 7,516,074 | B2 | 4/2009 | Bilobrov |
| 7,567,899 | B2 | 7/2009 | Bogdanov |
| 7,587,602 | B2 | 9/2009 | Rhoads |
| 7,590,259 | B2 | 9/2009 | Levy et al. |
| 7,627,477 | B2 | 12/2009 | Wang et al. |
| 7,698,254 | B2 | 4/2010 | Grabowski et al. |
| 7,725,318 | B2 | 5/2010 | Gavalda et al. |
| 7,788,279 | B2 | 8/2010 | Mohajer et al. |
| 7,853,438 | B2 | 12/2010 | Caruso et al. |
| 7,853,664 | B1 | 12/2010 | Wang et al. |
| 7,865,368 | B2 | 1/2011 | Wang et al. |
| 7,881,657 | B2 | 2/2011 | Wang et al. |
| 7,941,554 | B2 | 5/2011 | Grigorovitch et al. |
| 8,027,365 | B2 | 9/2011 | Boic et al. |
| 8,161,160 | B2 | 4/2012 | London et al. |
| 8,275,854 | B2 | 9/2012 | Ahn et al. |
| 2002/0072982 | A1 | 6/2002 | Barton et al. |
| 2002/0140719 | A1 | 10/2002 | Amir et al. |
| 2002/0178410 | A1 | 11/2002 | Haitsma et al. |
| 2002/0184505 | A1 | 12/2002 | Mihcak et al. |
| 2003/0105640 | A1 | 6/2003 | Chang |
| 2003/0120749 | A1 | 6/2003 | Kotzin |
| 2003/0156599 | A1 | 8/2003 | Casaccia et al. |
| 2003/0229900 | A1* | 12/2003 | Reisman .................... 725/87 |
| 2004/0031058 | A1* | 2/2004 | Reisman .................... 725/112 |
| 2005/0010787 | A1 | 1/2005 | Tarbouriech |
| 2005/0147256 | A1 | 7/2005 | Peters et al. |
| 2006/0031914 | A1 | 2/2006 | Dakss et al. |
| 2006/0041639 | A1 | 2/2006 | Lamkin et al. |
| 2006/0068818 | A1 | 3/2006 | Leitersdorf et al. |
| 2006/0125962 | A1 | 6/2006 | Shelton et al. |
| 2006/0271540 | A1 | 11/2006 | Williams |
| 2006/0274214 | A1 | 12/2006 | Carro |
| 2007/0055500 | A1 | 3/2007 | Bilobrov |
| 2007/0058949 | A1 | 3/2007 | Hamzy et al. |
| 2007/0067297 | A1* | 3/2007 | Kublickis .................... 707/9 |
| 2007/0112565 | A1 | 5/2007 | Kim et al. |
| 2007/0168542 | A1 | 7/2007 | Gupta et al. |
| 2007/0199035 | A1 | 8/2007 | Schwartz et al. |
| 2007/0276733 | A1 | 11/2007 | Geshwind et al. |
| 2008/0033986 | A1 | 2/2008 | McCusker et al. |
| 2008/0154401 | A1 | 6/2008 | Wang |
| 2008/0209021 | A1 | 8/2008 | Shamma |
| 2008/0214162 | A1* | 9/2008 | Ramer et al. ............ 455/414.2 |
| 2008/0223202 | A1 | 9/2008 | Shi |
| 2008/0249961 | A1 | 10/2008 | Harkness et al. |
| 2008/0250100 | A1 | 10/2008 | Hatanaka et al. |
| 2008/0291266 | A1 | 11/2008 | Burckart et al. |
| 2008/0301318 | A1 | 12/2008 | McCue et al. |
| 2009/0063151 | A1 | 3/2009 | Arrowood et al. |
| 2009/0082100 | A1 | 3/2009 | Zalewski |
| 2009/0106357 | A1 | 4/2009 | Igelman et al. |
| 2009/0113088 | A1 | 4/2009 | Illowsky et al. |
| 2009/0119101 | A1 | 5/2009 | Griggs |
| 2009/0164425 | A1 | 6/2009 | Olston et al. |
| 2009/0175499 | A1 | 7/2009 | Rosenblatt |
| 2009/0228570 | A1 | 9/2009 | Janik et al. |
| 2010/0080163 | A1 | 4/2010 | Krishnamoorthi et al. |
| 2010/0082585 | A1 | 4/2010 | Barsook et al. |
| 2010/0088726 | A1 | 4/2010 | Curtis et al. |
| 2010/0131297 | A1* | 5/2010 | Lemke et al. .................... 705/3 |
| 2010/0138561 | A1 | 6/2010 | Church |
| 2010/0299131 | A1 | 11/2010 | Lanham et al. |
| 2010/0305729 | A1 | 12/2010 | Glitsch et al. |
| 2011/0016172 | A1 | 1/2011 | Shah |
| 2011/0093492 | A1 | 4/2011 | Sull et al. |
| 2011/0202524 | A1 | 8/2011 | Shah |
| 2011/0208726 | A1 | 8/2011 | Shah |
| 2011/0209191 | A1 | 8/2011 | Shah |
| 2012/0047166 | A1 | 2/2012 | Katz et al. |
| 2012/0084455 | A1 | 4/2012 | McCue et al. |
| 2012/0102233 | A1 | 4/2012 | Shah et al. |
| 2012/0144435 | A1 | 6/2012 | Spilo et al. |

OTHER PUBLICATIONS

Lempel, Ronny et al., "Predictive Caching and Prefetching of Query Results in Search Engines", Department of Computer Science the Technion, Haifa, Israel 2003 , all.

"TV Station Market Trial Overview", Sep. 9, 2008 , all.

"What is BlabBlab Live.tv.chat", Feb. 4, 2009 , all.

"International Application Serial No. PCT/US2010/036492, Search Report and Written Opinion mailed Dec. 6, 2010", , 26.

"Project New England Interim Report Q4 s008", Backchannelmedia, Inc www.backchannelmedia.com , all.

"U.S. Appl. No. 13/097,964, Non-Final Office Action mailed Nov. 13, 2012", U.S. Appl. No. 13/097,964—NFOA—111312 NPL-10 17 pages , Nov. 13, 2012.

"U.S. Appl. No. 13/097,293, Non-Final Office Action mailed Nov. 14, 2012", U.S. Appl. No. 13/097,293—NFOA—111412 NPL-11 Nov. 14, 2012 , 18 pgs.

"U.S. Appl. No. 12/789,377, Non-Final Office Action mailed Oct. 26, 2012", U.S. Appl. No. 12/789,377—NFOA—102612 NPL-9 Oct. 26, 2012, 28 pgs.

"U.S. Appl. No. 12/837,842, Non-Final Office Action mailed Oct. 17, 2012", U.S. Appl. No. 12/789,377—NFOA—101712 NPL-8 Oct. 17, 2012 , 16 pages.

"U.S. Appl. No. 12/837,842, Notice of Allowance mailed May 13, 2013", 20 pages.

PCT Application No. PCT/US11/43944 International Search Report and Written Opinion mailed May 13, 2013, 9 pages.

* cited by examiner

US 8,489,777 B2

SERVER FOR PRESENTING INTERACTIVE CONTENT SYNCHRONIZED TO TIME-BASED MEDIA

RELATED APPLICATIONS

This application is a continuation of U.S. application Ser. No. 12/837,842 filed Jul. 16, 2010, which is a continuation-in-part of U.S. application Ser. No. 12/789,377 filed on May 27, 2010, which application claims the benefit of U.S. Prov. App. No. 61/181,472 filed on May 27, 2009. The entire content of these applications is hereby incorporated by reference.

BACKGROUND

Time-based media presentations such as movies, animation, sports events, live or pre-recorded television broadcasts, and so forth may be presented in a variety of formats and a variety of venues that may range from new movie releases in movie theaters to time-shifted home viewing of pre-recorded television broadcasts. There remains a need for synchronization capabilities that permit individual devices to synchronize to a time-based media presentation regardless of when and where the presentation is being displayed, as well as a need for delivery of interactive content synchronized to multiple, asynchronous instances of such media.

SUMMARY

Where multiple client devices are synchronized to multiple, asynchronous instances of a time-based media presentation such as live and time-shifted views of a television broadcast, interactive content can be delivered to each one of the various devices at a particular time (or "time offset") within the presentation independent of when each instance of the time-based media presentation is viewed.

In one aspect, a method disclosed herein includes receiving a plurality of time offsets from a plurality of client devices that identify a temporal location in a presentation of time-based media for each one of the plurality of client devices; and transmitting time-based interactive content selected according to the temporal location to at least one of the plurality of client devices.

Transmitting time-based interactive content may include transmitting a presentation offset in order to synchronize display of the time-based interactive content on each one of the plurality of client devices. The interactive content may include a quiz related to the presentation. The method may include scoring one or more responses to the quiz and transmitting a quiz result to one or more of the plurality of client devices. The interactive content may include a poll temporally related to the presentation. The method may include transmitting a result for the poll to one or more of the plurality of client devices. The interactive content may include a display of a plurality of search queries from one or more of the plurality of client devices that may have been synchronized to the presentation, each one of the plurality of search queries synchronized to the presentation according to an independently determined time offset for each respective one of the plurality of client devices. The plurality of search queries may be ranked according to popularity. The plurality of search queries may be filtered according to popularity. The method may include updating the interactive content for each one of the plurality of devices as the time offset for that one of the plurality of devices changes over an interval of the presentation. The presentation may include a live television broadcast. The presentation may include a time-shifted television broadcast. The presentation may include a display to the client device from a pre-recorded media including at least one of a CD, a DVD, a Blu-ray disc, and an HD DVD.

Synchronizing the client device may include: receiving data representative of an audio component of the presentation from each one of the plurality of client devices; determining for each one of the plurality of client devices a time offset within the presentation; and transmitting the time offset for each one of the plurality of client devices to that one of the plurality of client devices. The interactive content may include an instant messaging interface that couples the plurality of client devices in a communicating relationship for synchronous chat.

In another aspect, a computer program product disclosed herein for providing interactive content, the computer program product includes computer executable code embodied in a non-transitory computer readable medium that, when executing on one or more computing devices, performs the steps of: receiving a plurality of time offsets from a plurality of client devices that identify a temporal location in a presentation of time-based media for each one of the plurality of client devices; and transmitting time-based interactive content to at least one of the plurality of client devices.

Transmitting time-based interactive content may include transmitting a presentation offset in order to synchronize display of the time-based interactive content on each one of the plurality of client devices. The interactive content may include a quiz related to the presentation. The computer program product may include code that performs the step of scoring one or more responses to the quiz and transmitting a quiz result to one or more of the plurality of client devices.

In another aspect, a server disclosed herein includes a data network interface configured to provide a communicating relationship with a data network; a database; and a processor configured to receive through the data network interface a plurality of time offsets from a plurality of client devices that identify a temporal location in a presentation of time-based media for each one of the plurality of client devices, and to transmit time-based interactive content to at least one of the plurality of client devices through the data network interface.

DRAWINGS

The invention may be more fully understood with reference to the accompanying drawings wherein.

DETAILED DESCRIPTION

Disclosed herein are systems, methods, devices, computer code, and means for synchronizing to a time-based media presentation based upon an audio channel of the time-based media presentation. It will be understood that while an audio channel provides one useful source for synchronization, any channel such as a video, slide show, or concurrent data channel may also or instead be used for synchronization as described herein.

Figure 1:
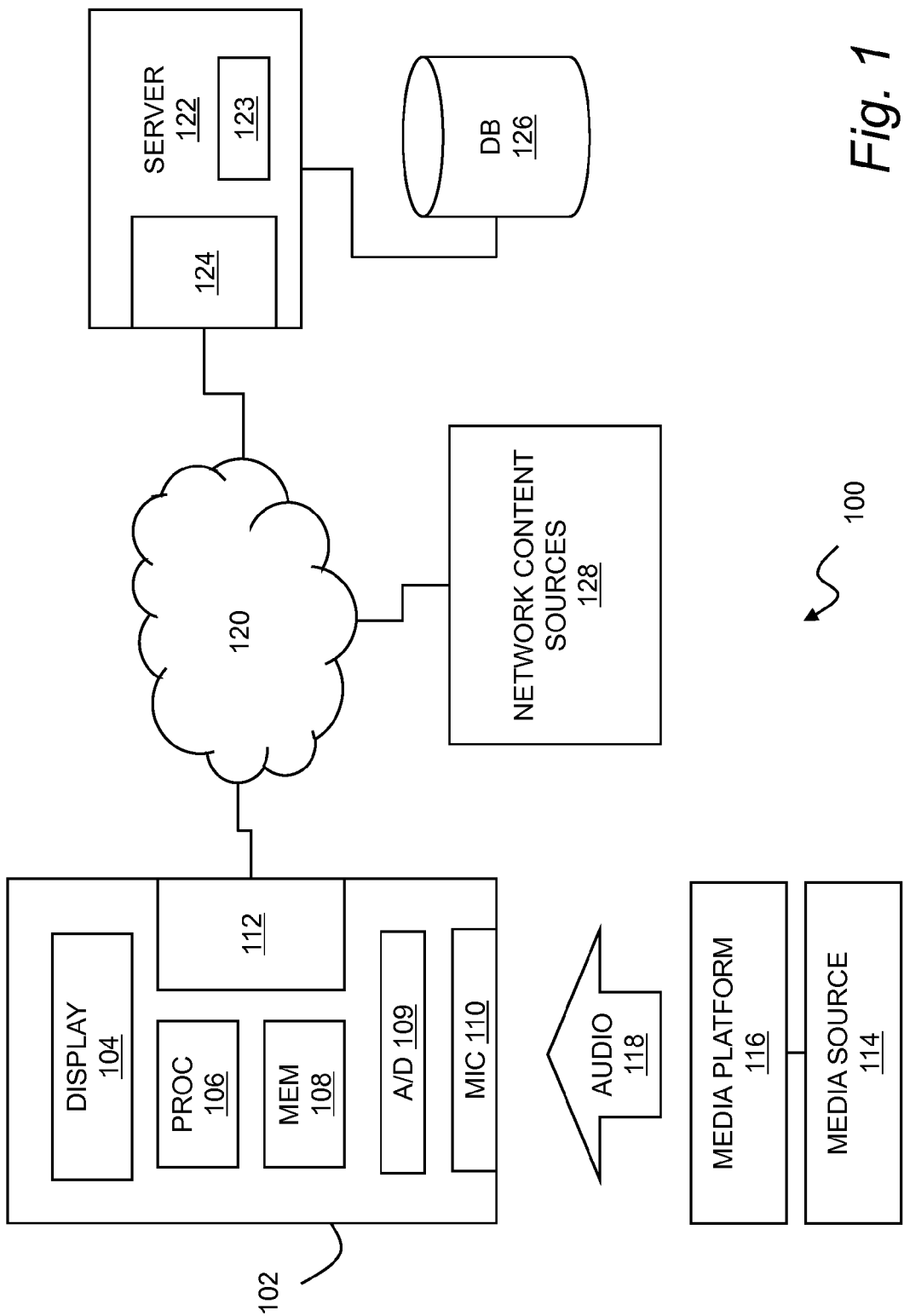
FIG. 1 is a block diagram of a synchronization system.

FIG. 1 is a block diagram of a synchronization system. The system 100 may include a client device 102 with a display 104, a processor 106, a memory 108, an analog-to-digital converter 109, a microphone 110, and a data network interface 112. The system may further include a media source 114, a media platform 116 that emits an audio portion 118 of a time-based media presentation, a data network 120, a server 122 including a data network interface 124 and a database 126, and data network content sources 128.

The client device 102 may be any device with a housing having a microphone 110, a data network interface 112, and other components collectively capable of performing the functions generally described herein. By way of example and not of limitation, this may include a laptop computer, a notebook computer, a netbook computer, and a desktop computer. This may also or instead include a communication device such as a cellular phone, electronic mail device, or the like. The client device 102 may also or instead include a mobile device such as a personal digital assistant, media player, smart phone, iPod, or the like.

The display 104 may be a screen or the like for displaying graphical information. By way of generality, the client device 102 may also provide for any of a variety of outputs including text, pictures, video, sound, and so forth, and all such output devices, or any other output devices that can be controlled by the client device 102 to provide information (e.g., buzzers, light-emitting diodes, etc.) are intended to fall within the scope of the display 104 as that term is used herein.

The processor 106 may include a general purpose microprocessor, a digital signal processor, an application specific integrated circuit, or any other processing circuitry or combination of the foregoing that controls operation of the client device 102 and the components thereof, as further programmed or otherwise configured to perform the additional processing for synchronization as described herein. This may in general include software executing on a general processing unit of the processor 106, or a dedicated, special purpose processor or other processing circuitry or hardware configured to perform the synchronization functions described herein, or a chipset or the like controlled by the processor to perform the synchronization functions described herein. All such variations that would be apparent to one of ordinary skill in the art are intended to fall within the scope of this disclosure.

The memory 108 may include any conventional memory for an electronic device suitable for storing digital samples from the microphone 110, and otherwise supporting synchronization functions as described herein.

The analog-to-digital converter 109 may be any combination of circuits, processors, chips, chipsets and the like suitable for capturing a sequence of digital samples from an analog microphone signal received from the microphone 110. One common sampling rate consistent with Compact Disc quality audio is 44.1 kHz with 16 bit samples. However, it will be understood that other rates a sample sizes are commonly employed in a variety of applications, and larger or smaller samples, at higher or lower sample rates may be provided by the analog-to-digital converter without departing from the scope of this disclosure.

The microphone 110 may be any microphone capable of converting audio energy to electrical signals for use by the analog-to-digital converter 109. This may for example include a microphone integrated into the client device 102, or an external microphone connected to the client device 102 through a jack or input plug, or some combination of these. It should also be appreciated that while specific hardware is described, this description is by way of an example of a common, commercially available architecture. But more generally, any combination of components suitable for converting audio energy into digital samples may be suitably adapted to use with the client device 102 described herein.

The data network interface 112 may include any hardware for connecting the client device 102 in a communicating relationship with a data network such as the data network 120. This may for example include a data network interface card for wired Ethernet or other wired connectivity, or this may include a wireless data networking circuit supporting standardized or proprietary data network communications. Common standards that may be usefully employed in the data network interface 112 of the client device 102 include Bluetooth, IEEE 802.11 (e.g., WiFi), IEEE 802.16 (e.g., WiMax), and cellular or other wide area broadband data standards, as well as combinations of the foregoing.

The media source 114 may be any source of a time-based media presentation. This may, for example, include a DVD, HD DVD, Blu-ray Disc, or other optical, magnetic, or electronic media having content pre-recorded thereon, along with any computer, disc player, tape player, or other device used to provide an electronic version of the pre-recorded content. The media source 114 may also include a broadcast medium such as analog or digital television broadcasts, cable television, Internet television, and so forth. The media source 114 may also include a source of media for time-shifted viewing of a television broadcast or the like such as a Digital Video Recorder, or other local or data networked archive of content for time-shifted viewing. This may also or instead include on-demand programming received through a cable data network, a data network (e.g., the Internet) or the like. This may also or instead include streaming media from an Internet data source or the like. While video multimedia such as movies, sports events, television broadcasts, and any other live or pre-recorded video and the like is generally contemplated as time-based media, it will be appreciated that time-based media may more generally include any media that changes over time such as sound recordings, radio programs, music, slide shows, animations, animated graphics, video games, and so forth, any of which may be stored on a pre-recorded medium, received over a data network, received through a cable data network, received through an aired broadcast, or otherwise made available in a locally reproducible form as a time-based media presentation.

The media platform 116 may be any device or combination of devices that receives a time-based media presentation from the media source and renders the time-based media presentation for viewing. This may include without limitation a computer, cable set top box, satellite dish, stereo, television, and so forth, as well as combinations of the foregoing. Thus, for example a consumer may install a satellite dish, authenticate a satellite decoder over a telephone land line, decode satellite signals with a satellite decoder to provide a time-based media presentation in electronic form, and render the time-based media presentation using a television to render the video images and a stereo to render the audio portion 118.

The audio portion 118 of the time-based media presentation may be reproduced as sound energy in a viewing environment. The client device 102 may in general capture the audio portion 118 using the microphone 110 and analog-to-digital converter 109 to provide digital samples of the audio portion. These digital samples may be further processed by the client device 102 and used in a synchronization process as described in further detail below.

The data network 120 may include any data network such as, for example, the Internet, as well as any intermediate data networks or devices between the client device 102 and the server 122, such as local area data networks, Internet service providers, air interfaces to cellular or telecommunications company infrastructures, and so forth, as well as cable, telephone, or satellite infrastructure adapted for data communications. All such variations that can provide end-to-end data communications between the client device 102 and the server 122 may serve as the data network 120 described herein.

The server 122 may be any combination of hardware and software capable of responding to requests over the data network 120 from the client device 102. The server 122 may include one or more processors 123 including processing circuitry such as any of the processing circuitry described herein configured in hardware and/or software to perform the various functions described herein. The server 122 may, for example, include a web server or the like that responds to HyperText Transfer Protocol requests, or any other standard or proprietary information server that supports sessions with client devices for exchange of information as more generally described herein through a data network interface 124. The server 122 may also include a database 126, such as a relational database, lookup tables, files, and so forth, that stores information such as hash tables for pre-processed media, all as described in greater detail below. Any database capable of information retrieval consistent with operation of the server 122 as described herein may be used as the database 126 of the server 122.

Data network content sources 128 may be any sources of content connected to the data network 120. As generally discussed below, once the client device 102 is synchronized to a time-based media presentation, the client device 102 may retrieve and render synchronized content, either from the server 122 that provides synchronization functions, or any other data network content sources 128 such as web sites, advertisement servers, streaming media servers, e-commerce sites, or any other remote site or resource. The additional content synchronized to the time-based media presentation may, for example, include a supplemental video stream, contextual information, advertising, interactive content, and any other content that might be related to the time-based media presentation, and more specifically, to a particular time offset within the time-based media presentation. In general, the synchronized content may be retrieved on an as-needed basis during a presentation, or pre-cached for some or all of the presentation so that it is locally present in the memory 104 of the client device 102 at the appropriate time.

Figure 2:
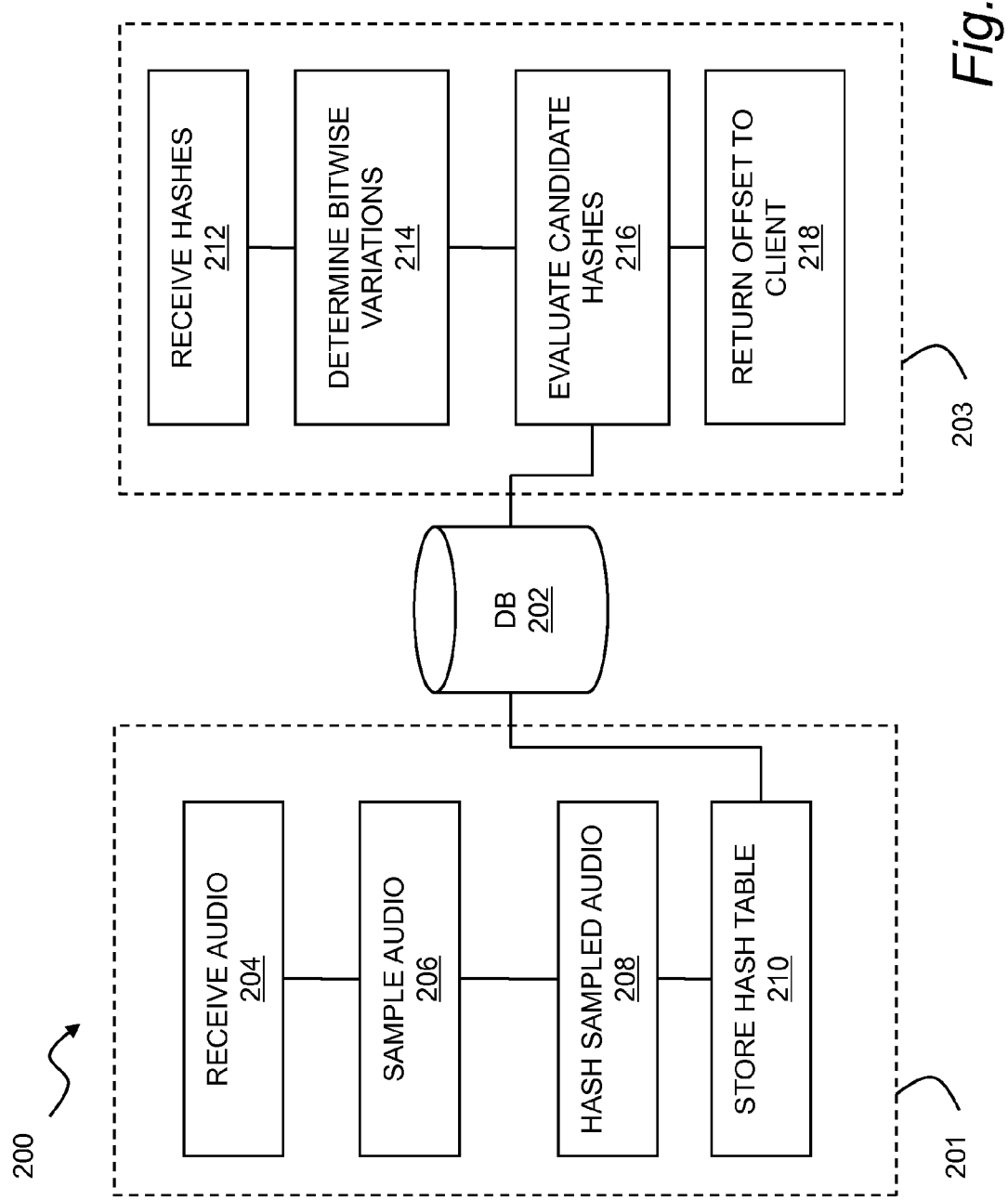
FIG. 2 is a flow chart of a server-side process for synchronization.

FIG. 2 is a flow chart of a server-side process for synchronization. In general, the process 200 may include pre-processing 201 of media to store hash tables or the like in a database 202, and responding to client requests for synchronization 203 based upon the hash tables for the pre-processed media, all as more specifically described below.

As shown in step 202, the process 200 may begin by receiving an audio portion of a time-based media presentation such as any of the media from any of the media sources described above.

As shown in step 204, the audio may be sampled into a sequence of digital samples from the audio portion. This may include digitizing an audio rendering of the audio portion, or where the media is available in digital format, simply copying the digital audio, or a subset of the digital audio to provide a sequence of digital samples for further processing.

As shown in step 208, a plurality of hashes may be calculated from the sequence of digital samples of the time-based media presentation. In general, the plurality of hashes may be a time wise sequence of hashes corresponding to digital samples of audio from the time-based media presentation. Each one of the plurality of hashes may be a non-unique representation of a portion of audio from the time-based media presentation corresponding to a particular time offset within the time-based media presentation.

A variety of hashing functions are known in the art and may be adapted to the audio-based synchronization systems described herein. One such hashing function is described in Ke et al., *Computer Visions for Music Identification*, the entire content of which is incorporated herein by reference. While Ke proposes a hashing function for us in music identification, the hashing algorithms of Ke can be adapted to synchronization as generally described herein. In one embodiment, a useful hashing function may include processing as described in greater detail below.

As an initial step, the amount of data from digital samples obtained at the native sampling rate may be reduced by selecting a subset of the digital samples at some predetermined frequency, e.g. every other sample, every third sample, and so forth. The digital samples may also or instead be down-sampled to a predetermined frequency such as about five thousand five hundred Hertz (5.5 kHz) so that hashing can be performed consistently across multiple audio receiver types. The digital samples may also or instead be windowed to provide a sequence of overlapping, windowed data sets. In one embodiment, each one of the sequence of data sets may be obtained from a window of 1024 samples, with each window offset by 64 samples, thus providing a high degree of overlap for each windowed data set. More generally, any offset and/or window set consistent with the synchronization processes described herein may be employed.

Each windowed data set (or sequence) of digital samples may also or instead be process by normalizing a magnitude of the sequence of digital samples to some predetermined value. This step helps to mitigate differences in playback volume of a presentation, sensitivity of audio receiving hardware, distance from the media platform (or speakers of the media platform), room size, and other environmental conditions that might affect the sound captured by the client device. Each sequence of digital samples may also or instead be band pass filtered or low pass filtered, which may include filtering with a low pass filter to provide a filtered output. This may include the use of a digital filter having a 3 dB cutoff of 2.2 kHz, or about two kilohertz, or any other suitable digital and/or analog filter to reduce noise and suppress signal components outside the range of interest.

However processed, each sequence of digital samples may be transformed into a frequency-domain representation using, e.g., a discrete Fourier transform or other suitable algorithm. The frequency-domain representation may then be hashed by dividing the frequency spectrum into a number of frequency bands and converting the signal energy in each band into a binary value according to the relative power in each band compared to each other one of the frequency bands within the frequency-domain representation. In one aspect, the spectrum may be divided into thirty two bands, with each band represented by a single bit (e.g., a one or a zero) to provide a thirty two bit hash of the sequence of digital samples. The spectrum may be divided in a number of ways, such as linearly into equal size bands or logarithmically into bands of logarithmically increasing bandwidth. The resulting hash, which provides a compact non-unique description of the sampled audio, may then be accumulated with additional hashes for further processing.

As shown in step 210, the sequence of hashes may be stored, along with the corresponding one or more time offsets in a hash table that permits retrieval of the one or more time offsets with a hash value. The hash table may, for example, be stored in a database on a server configured to respond to a request from a client device.

The above pre-processing 201 may be performed any number of times for any number of time-based media presentations, with hash tables for each media item stored in the database 202 for subsequent synchronization processes. Turning now to the synchronization process 203, the following steps detail the manner in which a server responds to client requests. In general, the server may be configured to respond to a request from a client device containing a number of hashes (and explicit or implicit sequence numbers for the hashes) with a number of candidate time offsets corresponding to each one of the hashes. In general, the candidate hashes may be resolved into an offset within the time-based media presentation by the server, or forwarded to the client for further processing. By performing this additional processing at the server, the client is relieved of further synchronization calculations and the offset can be advantageously transmitted over a data network as a single numerical value.

As shown in step 212, a server may receive a number of hashes from a client device. These hashes generally include hashes calculated at the client device based upon audio data acquired by the client device. The server may also receive supplemental information to assist in a synchronization process, such as explicit sequence numbers for each hash and/or a unique identifier of the time-based media presentation that explicitly identifies the presentation to the server. While the systems and methods described herein may be employed without such an identifier, this information can greatly simplify and speed synchronization calculations by reducing the data set against which the server must search for candidate time offsets.

As shown in step 214, a number of bitwise variations to each received hash may be identified. In general, this includes determining an allowable bit error for the hash, or a number of allowable bitwise variations that are to be evaluated in subsequent synchronization processing, which value may for example be stored in the memory of the client device and transmitted to the server. Finding the bitwise variations to the hash may also be described as determining all values within a specified Hamming distance of the calculated hash, which provides a certain allowance for variations between the ideal source audio (used for pre-processing as described above) and the audio portion of a presentation as captured and digitized by a client device. With a predetermined allowable bit error, all of the binary values within that number of bits of the hash may readily be determined using any suitable technique. One useful technique is described in greater detail below with reference to FIG. 3. Other techniques are known in the art and may be useful employed to calculate bitwise variations to a hash as described herein. In one embodiment, the hash may include thirty two bits, and the allowable bit error may be eight bits. The resulting candidate hashes provide a basis for further synchronization processing that accommodates variations in the audio as captured by the client device.

It will be understood that while calculation of candidate hashes is described above as a server-side function, the candidate hashes may also or instead be calculated by a client with suitable processing capability and communication bandwidth without impairing general operation of a synchronization process as described herein.

As shown in step 216 the candidate hashes may be evaluated to determine an actual offset within a time-based media presentation. For each candidate hash (which has a relative offset to other candidate hashes), any corresponding time offsets are retrieved from the hash table and a count or score is incremented for each one of the corresponding time offsets. A score or count is accumulated for each time offset retrieved from the hash table, with the scoring for each time offset shifted according to the sequence number (or time) of the corresponding candidate hash. In this manner, an offset within the time-based media most closely corresponding to a beginning of the hashes received from the client can be identified.

By way of simplified, illustrative example, the first client hash may produce two candidate hashes, and the two candidate hashes may yield three offsets at t=5, t=6, and t=10. The second client hash may produce two candidate hashes that yield from the hash table four offsets at t=6, t=10, t=14, and t=15. However, this second group of offsets must be shifted back one time increment to align with the previous group, so the second group would be used to accumulate a score at t=6−1=5, t=10−1=9, t=14−1=13, and t=15−1=14. Using a simple count, the accumulated scores would then be 2 at t=5, 1 at t=6, 1 at t=9, 1 at t=10, 1 at t=13, and 1 at t=14. A third client has may produce two candidate hashes that yield a single offset at t=14. Again, this third group must be shifted back (two time increments) to align with the previous groups, so the third group would accumulate a score at t=14−2=12. At this point the best score occurs at t=5, and an inference may be drawn that the time at which the first hash was calculated at the client device corresponds to an offset of t=5 within the time-based media presentation. It will be readily appreciated that for a preferred embodiment using a thirty two bit hash and a Hamming distance of eight, a significantly greater number of time offsets will actually be produced. However, the same basic approach may be employed to accumulate or otherwise score potential offsets within the media based upon time offsets retrieved from the hash table for candidate hashes.

As shown in step 218, the best score from among the plurality of scores may be used to select and return to the client an offset within the time-based media presentation corresponding to the beginning of the sequence of hashes sent by the client device. It will be understood that the offset returned to the client may also or instead include the time corresponding to the last of the sequence of hashes, or some other offset such as a median offset or an offset adjusted for network latency. It should also be understood that the server may only conditionally return an offset, such as when the best score reaches some predetermined minimum, or when a score for one offset is greater than all other scores by some predetermined relative or absolute amount, or based upon any other criteria that might be used to evaluate the quality of the score(s) and/or the inferences drawn therefrom. In one practical implementation with scoring weighted according to the number of bits in each hash (e.g., a score of thirty two for each retrieved time offset), useful criteria for a reliable synchronization include a minimum score of five thousand and a score of at least twice the next greatest score. Of course, other combinations of criteria may also or instead be used to determine whether and when to return an offset to a client device.

Figure 3:
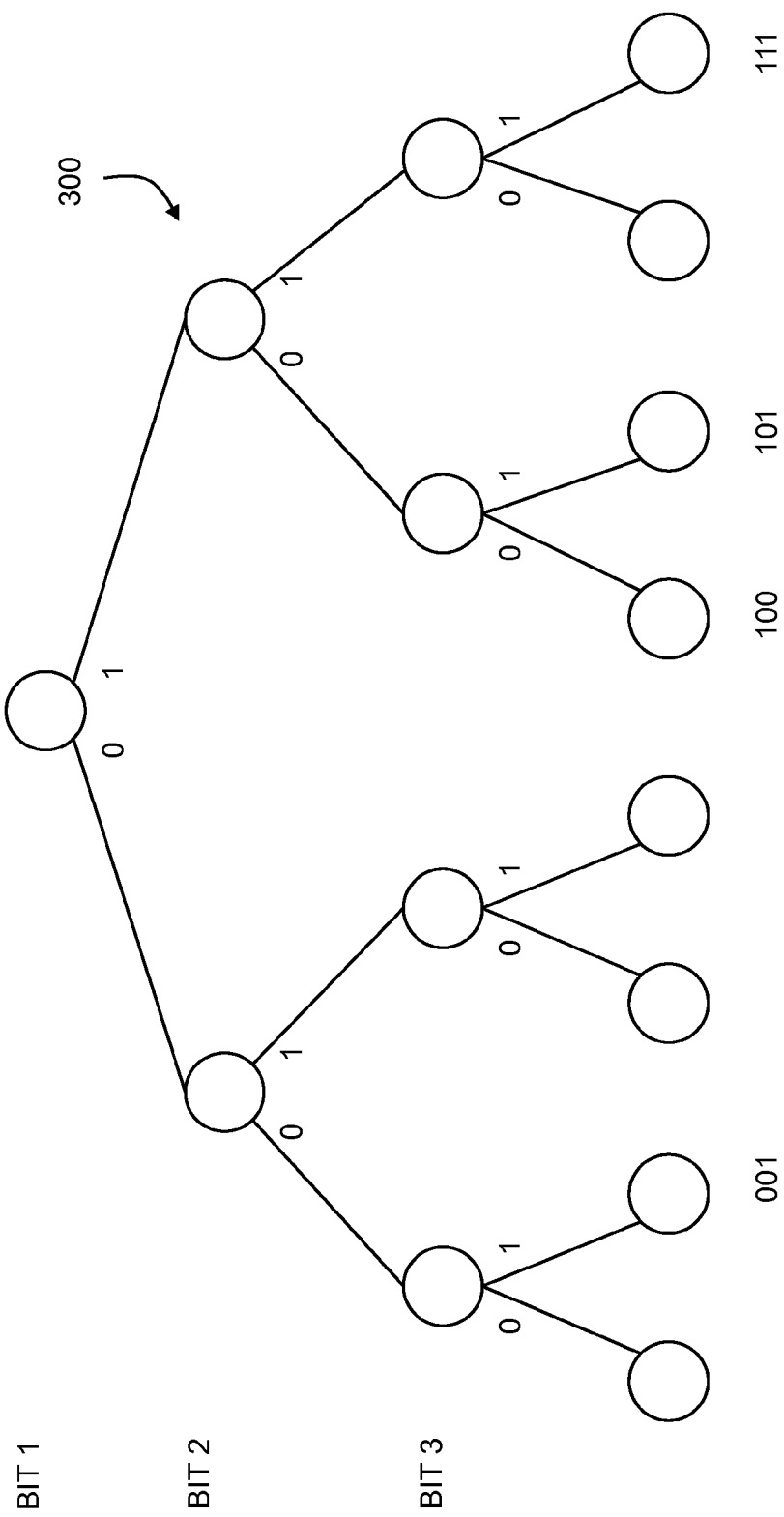
FIG. 3 illustrates a technique for identifying bitwise variations to a binary value.

FIG. 3 illustrates a technique for identifying bitwise variations to a binary value. As described above, a synchronization process may include a step of identifying candidate hashes corresponding to bitwise variations in a hash value calculated by a client or, as alternatively stated, determining a number of bitwise variations to a calculated hash. As described below, these candidate hashes may be determined using a binary tree or binomial tree that is traversed in a manner that excludes branches of the tree for binary values that exceed the allowable bit error for, i.e., Hamming distance from, the calculated hash.

In order to efficiently locate hash values that differ by a certain number of bits from a calculated hash, the server may create a binomial tree data structure 300 to hold loaded hash values. In a thirty two bit embodiment, the data structure 300 has thirty two levels with one level for each bit position in the hash. Each level includes left and right branches corresponding to zeroes and ones in a bit position of the hash value. In the simplified, illustrative embodiment of FIG. 3, the data structure 300 stores a three bit hash value. Starting at the top of the tree, a binary value of 101 would follow a path through the tree and be placed into a corresponding bucket (labeled "101") at the bottom of the data structure 300. In order to find hash values varying by not more than one bit, a search algorithm can traverse each leg of the tree as far as possible without traversing a branch that has more than one bit difference from the calculated hash (in this case resulting in terminals at "001", "100", and "111"). The efficiency in this approach results from the ability to avoid traversing branches that would not result in hashes within the desired Hamming distance. While the data structure 300 of FIG. 3 may appear simple, the processing gains are substantial for a thirty two bit hash and up to eight bits of variation. In general, the candidate hash values are not stored in the data structure 300. Rather, the candidate hash values are implied by the branch traversal that leads to a bucket at the bottom of the tree, with each terminal bucket representing a candidate hash, and containing zero or more position indices or time offsets corresponding to the implied candidate hash value. Thus, traversing the data structure 300 according to the bit error limits leads directly and efficiently to the hash table results for the calculated hash received from a client device. Thus in one aspect determining bitwise variations (FIG. 2, step 214) and evaluating candidate hashes (FIG. 2, step 216) to find candidate offsets may be combined into a single processing step. Other techniques suitable for identifying and evaluating candidate hashes will readily be appreciated, any of which may also or instead be adapted for use in the synchronization systems and methods disclosed herein.

Figure 4:
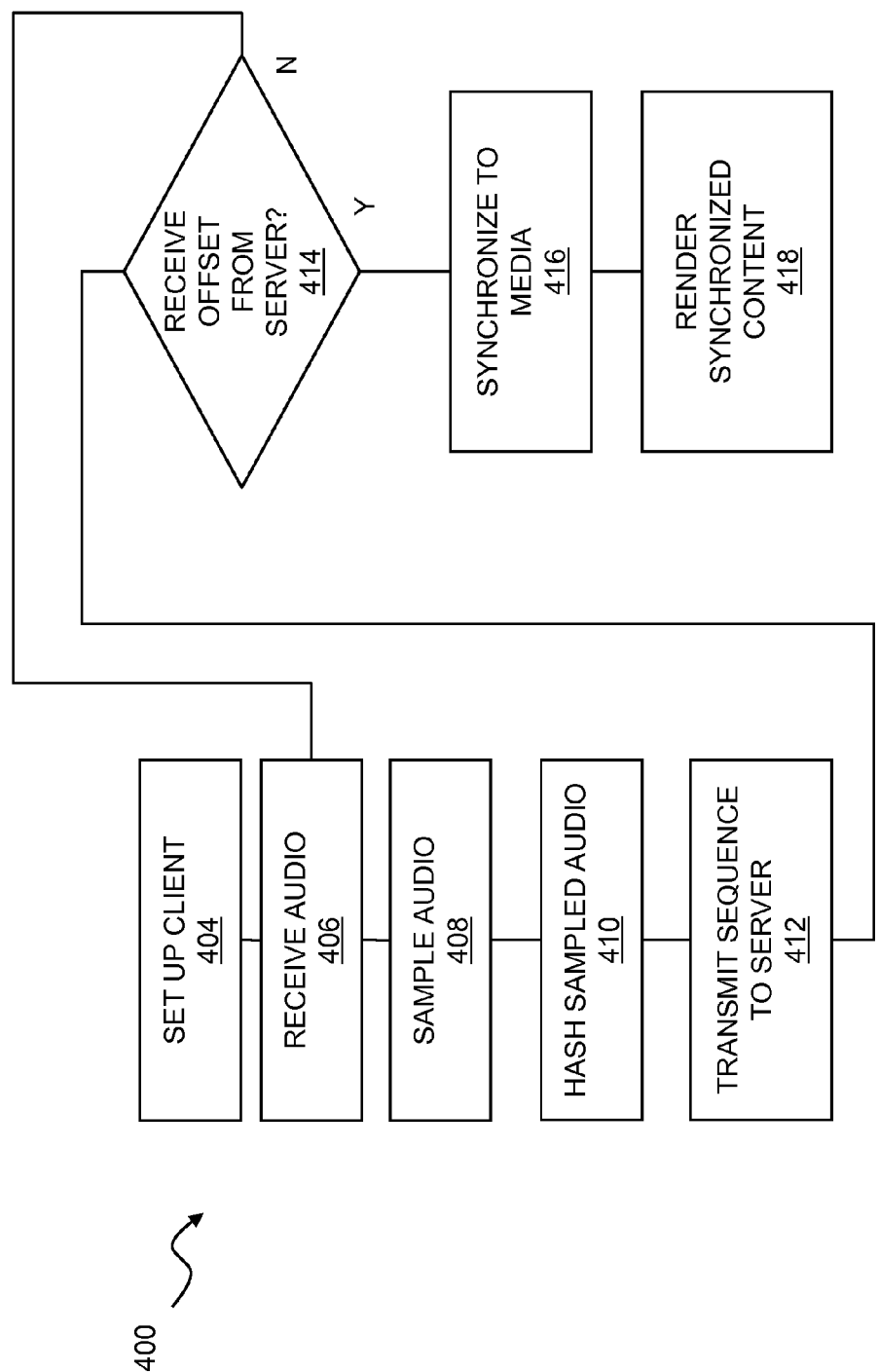
FIG. 4 is a flow chart of a client-side process for synchronization.

FIG. 4 is a flow chart of a client-side process for synchronization. The process 400 may in general include processing received audio to generate a sequence of hashes, and then transmitting the hashes to a server for remote calculation of a time offset in a time-based media presentation, after which a client device, which may be any of the client devices described above, may render synchronized content.

As shown in step 404, a client device, which may be any of the client devices described above, may be set up for synchronization such as by installing an application on the client device that performs synchronization functions, and/or any applications that might use synchronization to retrieve and/or display synchronized content. This may also or instead include establishing programming interfaces on the client device between existing applications and a synchronization application so that programs that are already installed (such as media players, web browsers, and so forth) can render synchronized content.

As shown in step 406, the client device may receive audio. This may, for example, include receiving an audio portion of a time-based media presentation with a microphone of the client device.

As shown in step 408, the client device may sample the audio, such as by using the analog-to-digital converter to provide a plurality of digital samples, and may receive at the processor a sequence of digital samples obtained with a sampling rate that establishes a time-based relationship among the sequence of digital samples. In one aspect, the subsequent hashing steps may be performed on overlapping windows of digital audio data, so that a next sequence of digital samples is obtained from an overlapping window of the audio portion of the time-based media presentation. In this manner, the windowing provides a series of overlapping sets of digital samples from the raw sequence of digital samples. The sets of digital samples may be further processed, such as be preserving only a subset of digital samples for processing, e.g., every other sample, every third sample, every eighth sample, or any other reduced data set consistent with proper functioning of subsequent synchronization functions.

As shown in step 410, the digital samples, such as a sequence or set of windowed digital samples, may be processed into a hash including a number of bits that non-uniquely corresponds to a portion of the time-based media presentation (and a time offset of that portion within the presentation). Over numerous repetitions of the process, a number of sequential hashes may be obtained for overlapping windows of digital samples. Each one of the hashes is derived from the content of a corresponding audio portion of the time-based media presentation, but does not uniquely identify the audio portion that it was derived from. That is, numerous segments of audio from the presentation may yield the same hash. Each one of the hashes may also have a sequence number, or a relative time offset to each other one of the plurality of hashes. These relative time offsets are generally not absolute in terms of the presentation, but may serve as an accurate indicator of the relative timing of each window of digital samples from which a hash was obtained. More generally, hashes may be prepared in a complementary process to the hashing performed on the pre-processed media as described above. More generally, any suitable processing to the digital samples may be performed consistent with the processing performed on the pre-processed media so that matching and synchronization can be performed.

As shown in step 412, a sequence of hashes may be transmitted to a server, along with any additional information such as a unique identifier for the time-based media presentation from which the hashes were derived and a sequence number for each one of the sequence of hashes indicated a relative time offset among the hashes. The time-based media presentation may be identified in a number of ways. For example, a user of the client device may manually identify the media-based presentation, or may provide descriptive information helpful in identifying the media such as a title of a television series, biographical data (actors, content, etc.), a time, date, and/or channel on which the media was broadcast, or any other useful information. In another aspect, the media may be identified using remote content analysis, such as by streaming audio or video samples directly to a remote server. While this process may be relatively bandwidth and/or computationally expensive, it may be performed one time prior to a synchronization, after which the more efficient synchronization techniques described herein may be employed to determine an offset within the time-based media presentation.

As shown in step 414, the client device may determine whether an offset has been received from the server. If an offset has been received from the server indicative of a time offset within the time-based media presentation, the process 400 may proceed to step 416 where the client device synchronizes based on the offset. If any offset has not been received, the process 400 may return to step 406 and the client device may receive, sample, and hash additional audio content for forwarding to the server. The server may also or instead respond with an explicit indication of a failure to determine the offset. Where an offset is returned, the offset may be provided as a specific offset within the time-based media presentation as generally described above, or a number of candidate offsets may be returned to the client device for local evaluation.

As shown in step 416, the client device may synchronize to the time-based media presentation based upon the offset received from the server, such as by storing in an application on the client device a current offset within the time-based media presentation. The local application may then coordinate synchronized activities on the client device such as retrieving relevant content, launching additional media viewers, web browsers, interactive programs or applets, and so forth. A synchronization indicator may be displayed on the client device indicating that a reliable synchronization has been achieved using, e.g., an icon or symbol on a display of the client device, or another indicator such as an audible tone, a flashing light-emitting diode, an animation, and so forth. Once synchronization has been achieved, the client device may autonomously maintain synchronization by assuming uninterrupted delivery of the time-based media presentation, and/or the client device may continuously or periodically confirm synchronization with additional sequences of hashes transmitted to the server.

As shown in step 418, once the client device has synchronized to the time-based media presentation, synchronized content may be rendered on the client device. This may include any additional content such as supplemental streaming video, textual information, interactive content, advertisements, hyperlinks, and so forth. An application on the client device that coordinates synchronization using the remote server may also control rendering of the additional content in a manner that is synchronized to the time-based media, either by directly rendering the content or by controlling one or more other applications on the client device to render the content.

In addition, audience feedback concerning the time-based media presentation may be gathered from time-shifted views of the presentation and correlated to audience feedback from a live presentation. The feedback may, for example, be gathered explicitly with user inputs to the client device, or implicitly such as by detecting a change of channel or termination of the presentation using, e.g., the audience tracking techniques described below. Thus in one aspect there is disclosed herein a technique for combination additional audience (or client device) feedback from time-shifted viewing with live audience feedback to provide feedback data that aggregates audience feedback synchronized to both a liver version of the presentation and a time-shifted view of the presentation.

It will be understood that the steps of the above methods may be varied in sequence, repeated, modified, or deleted, or additional steps may be added, all without departing from the scope of this disclosure. By way of example various processing steps may be performed on the server, on the client device, or some combination of these. In addition, a client device may synchronize to multiple media sources at one time, and a server may be configured to support synchronization of multiple clients at one time. Thus, the details of the foregoing will be understood as non-limiting examples of the systems and methods of this disclosure.

Figure 5:
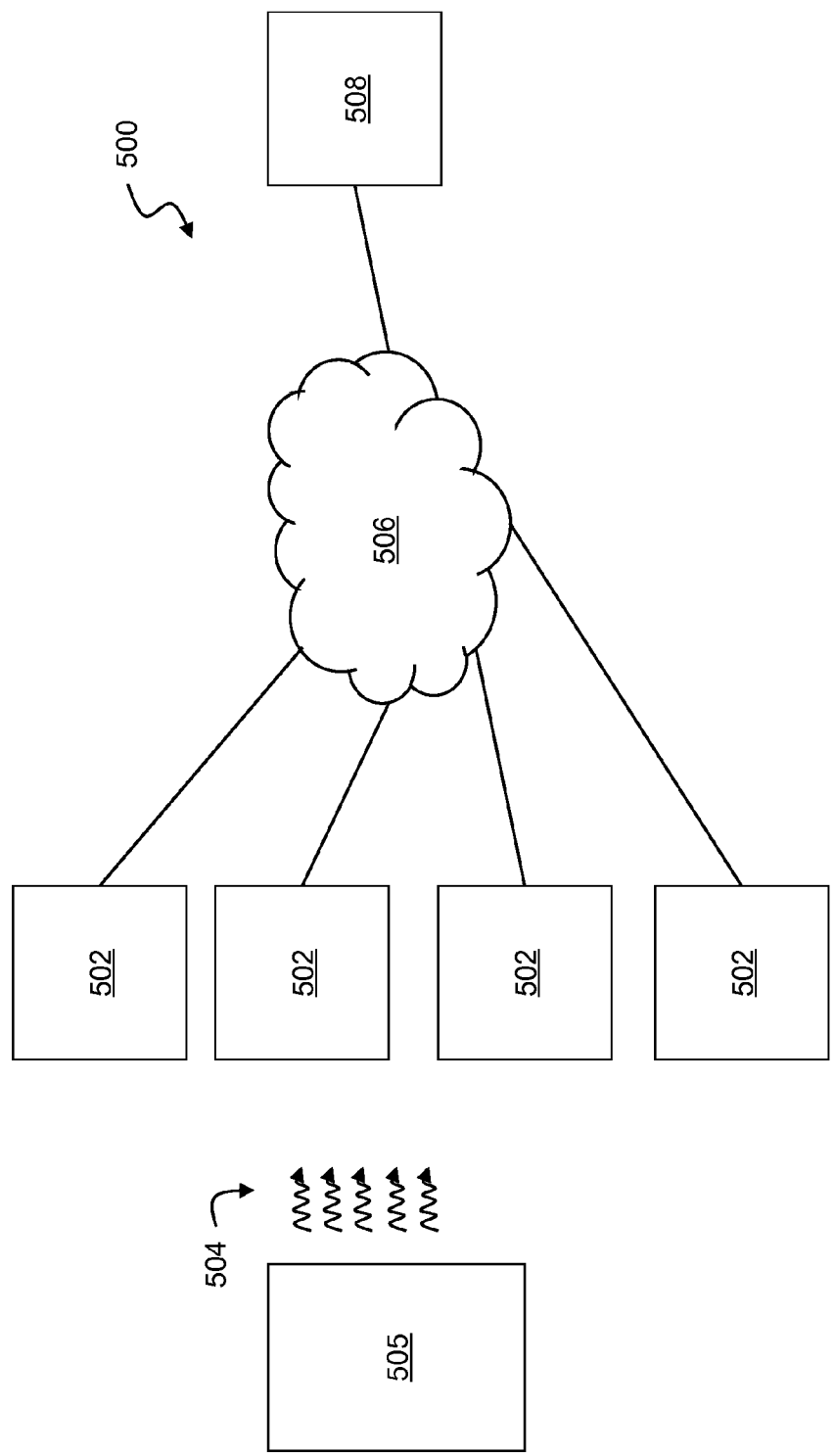
FIG. 5 is a block diagram of an audience tracking system.

FIG. 5 is a block diagram of an audience tracking system. In general, the system 500 may include a number of client devices 502 receiving audio 504 from a media source 505 such as a television broadcast. The client devices 502 may process the audio 504 to derive a sequence of hashes that are transmitted over a data network 506 to server 508 where analysis can be performed.

The client devices 502 may, for example, be any of the client devices described above. While four client devices 502 are depicted, any number of client devices 502 may participate in the system 500, including any combination of client devices 502 at one geographic location and/or numerous geographic locations. Each client device 502 may receive the audio 504 and create a sequence of hashes that characterize audio content within the audio 504. This may include any of the hashing processes described above, or any other hashing process that uniquely or non-uniquely identifies the audio content.

The media source 505 may, for example, include televisions systems or stereo or other audio output systems rendering media such as a live television broadcast. Where the client devices 502 are geographically distributed, the media source 505 may likewise include hardware rendering the broadcast at a variety of locations including public locations such as airports, lounges, waiting rooms, and so forth, as well as private locations such as homes or offices, as well as any combination of these.

The data network 506 may include any of the data networks described above, and the server 508 may include any server or combination of servers or the like capable of receiving sequences of hashes from client devices 502 and processing the sequences of hashes as described further below.

Figure 6:
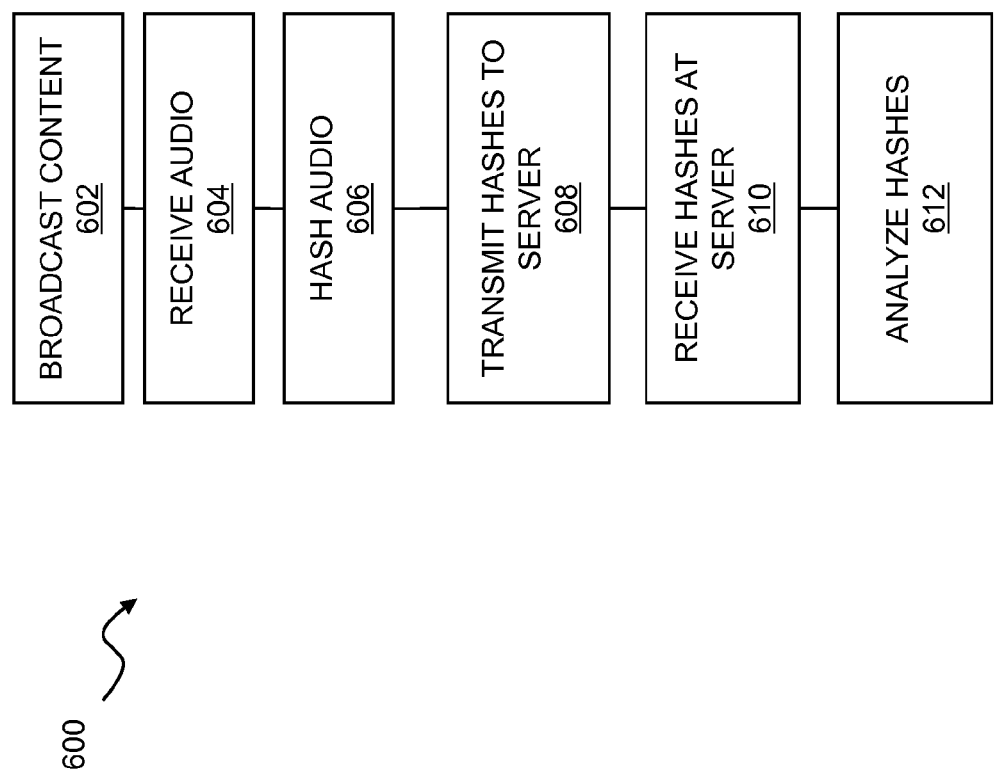
FIG. 6 is a flow chart of an audience tracking process.

FIG. 6 is a flow chart of an audience tracking process. In general, the process 600 includes hashing audio content at a number of client devices and forwarding the resulting sequences of hashes to a server for analysis.

As shown in step 602, the process 600 may begin by broadcasting media having an audio component. The broadcast media may include televised programming such as any live or pre-recorded television content including a television series, a movie, a sports event, informational programming, news, and so forth.

As shown in step 604, audio content from the broadcast media may be received by a number of client devices exposed to the broadcast media.

As shown in step 606, each client device may hash or otherwise process the audio content into a time-based sequence of hashes that uniquely or non-uniquely identify the audio content in the broadcast media at a particular time.

As shown in step 608, each client device may transmit the sequence of hashes to a server, such as any of the servers described above.

As shown in step 610, the server may receive the sequence of hashes from each participating client device, along with related information such as any explicit supplemental information provided by each client device, or information such as an IP address or the like for each client device, any of which may be usefully processed by the server to assist with subsequent analysis.

As shown in step 612, the server may analyze the sequences of hashes received from the participating client devices. A variety of useful inferences may be drawn from the resulting data set, including monitoring of audience behavior (such as channel changing) and advertising characteristics as described below. It will be readily appreciated that a range of additional statistics and conclusions may also or instead be extracted from the data set.

In one aspect, sequences of hashes from client devices exposed to a broadcast may be monitored in order to create descriptive signatures dynamically. For example, as client devices receive a broadcast, they may each create a sequence of hashes for the server. A general location for each client device may also be specified in advance by the client device, or inferred from the content that is being broadcast or other data such as the IP addresses for the client devices. As the client-generated signatures for a broadcast are received by the server, these submissions may be processed and an average or other composite signature may be obtained. A variety of techniques for combining or otherwise characterizing such variations may be employed. However derived, the composite signature may be stored and subsequently applied to correlate new references to the broadcast program to a particular time within the original broadcast. This may be useful, for example, when a viewer is watching a program on a time-shifted basis, such as to synchronize supplemental content to the time-shifted view. In this manner, the pre-processing described above may be omitted, and hash tables or the like for time-shifted synchronization may be created automatically from the sequences of hashes received from client devices during the live broadcast.

In another aspect, the sequences of hashes may be analyzed identify when local commercials are being aired. When a program is on, the averaged audio signals and the resulting sequences of hashes form client devices may remain within a narrow band based upon the underlying content. However, during commercial breaks, content may vary significantly based upon the advertising that is broadcast by each local network. When this happens, there may be a spike or other measurable change in signatures that varies according to the corresponding variation in advertisement content. This information may be usefully employed to infer a geographic location of client devices and for any other related purposes. This information may also or instead be used to distinguish between advertisements and other broadcast content, which may be usefully employed, for example, to determine how to relate post-broadcast signatures to the originally-broadcast content. Thus, more generally, based upon server analysis of sequences of hashes, the process 600 may include identifying an occurrence of a commercial break in the television broadcast based upon variations in concurrent ones of the plurality of hashes received from different ones of the client devices.

In another aspect, the sequences of hashes may be analyzed to identify network commercials. It has been observed that when commercials begin, a certain percentage of the public changes the channel. This will cause a deviation in the average audio signal band, but it will be the case that this deviation will occur to some extent in all localities. This pattern in received, client-generated signatures may be used to infer an occurrence of a commercial break. By extracting out the deviations and looking at the averaged data of those who have chosen to stay on the commercials, it will be possible to determine whether the commercials being played are network-wide or are local.

Thus in one aspect, the process 600 may include identifying a channel change in proximity to one of the client devices based upon a variation in the sequence of hashes received from the client device. In another aspect, the process 600 may include inferring a geographic proximity among two or more of the client devices based upon a similarity in concurrent ones of the hashes received from two or more the plurality of devices. In still another aspect, the process 600 may include determining whether a local advertisement or a network advertisement is being aired during a commercial break based upon variations among the hashes received from the various client devices.

Still more generally, by processing audio content from a broadcast device (such as a television or radio) on a client device and transmitting characteristic information to a server, the server can derive a variety of useful metrics that describe the broadcast stream as well as audience location, audience engagement in broadcast content, and so forth.

Described above are various techniques for synchronizing client devices to time-based media using, e.g., an audio component or audio channel of a presentation of the time-based media. In addition to the various uses of such a synchronization platform described above, the synchronization platform may be used to deliver interactive content to client devices that is individually synchronized to each such client device, regardless of where each instance of the presentation is time-wise for each client. Thus, in general, interactive, synchronized content may be delivered to multiple, asynchronous instances of a time-based media presentation.

Figure 7:
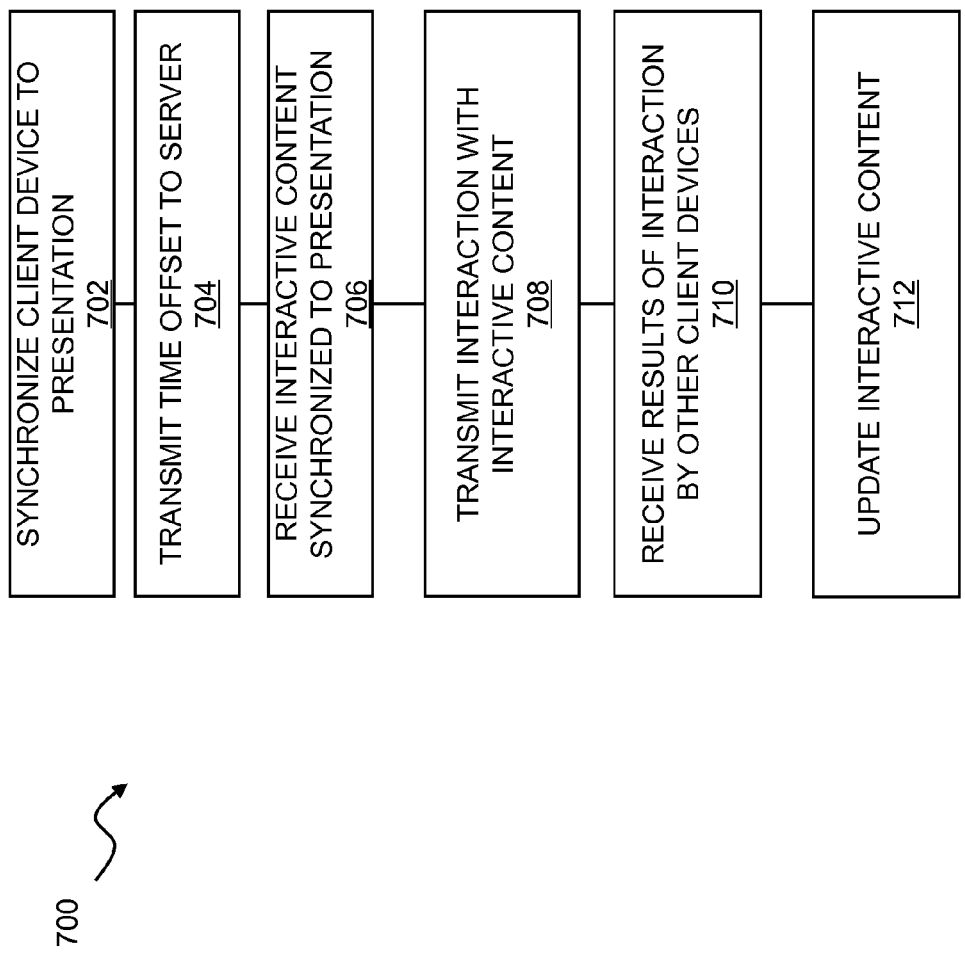
FIG. 7 is a flow chart of a process for receiving synchronized, interactive content at a client device.

FIG. 7 is a flow chart of a process 700 for receiving synchronized, interactive content at a client device, which may for example be any of the devices described above.

As shown in step 702, the process 700 may begin by synchronizing a client device to a presentation of time-based media. This may include, for example synchronizing based upon an audio component of the presentation to obtain a time offset within the presentation that represents a time within the time-based media that the client device is currently viewing or exposed to. This synchronization may be achieved using any of the techniques described above. In particular, it will be understood that synchronization as contemplated herein may include both identification of a presentation and a determination of a time offset within the presentation. Thus, for example, in embodiments a client device may simply be activated by a user in the presence of a television broadcast and, using the synchronization techniques described above, the client device may in cooperation with a server identify both what the television broadcast is and a time offset within the identified broadcast.

As shown in step 704, the client device may transmit the time offset to a server, such as any of the servers described above. It will be understood that the process 700 may employ fully explicit synchronization where, e.g., each time offset generated by the client is transmitted to the server, or the process 700 may employ implicit synchronization where, for example, a server that is delivering interactive content may continue to infer synchronization based upon a single time offset unless and/or until an unexpected change in time offset is received from the client device. Therefore, for example, the client device may deliver a single time offset, and the client device and/or server may assume that the time-based media presentation continues along an ordinary timeline until some predetermined event such as an end of a program, an unexpected silence, or an explicit indication by the client device that the presentation has been paused. The client device may also continuously transmit new time offsets as they are calculated, or the client may, after successful synchronization, transmit time offsets at some reduced rate, e.g., once per second or once per minute or any other suitable interval.

It will further be appreciated that where synchronization is performed in cooperation with a remote server, there may be no need to transmit a time offset from the client device and the server may directly determine a time offset for the client device based upon, e.g., hashes received from a client device as discussed above. For example, synchronization as described above may include sampling and processing the audio component of a time-based media presentation at the client device to provide representative data such as hashes; transmitting the representative data to a remote server; and receiving the time offset from the remote server, all as described above. Further, receiving the time offset may be omitted unless it has local relevance, such as for synchronizing multiple, local client devices to one another and/or to a common instance of the presentation.

As shown in step 706, the process 700 may include receiving at the client device interactive content synchronized to the presentation based upon the time offset. The interactive content may be any form of interactive content suitable for the client device and/or relevant to the time-based media presentation. This may for example include a quiz related to the presentation, a poll temporally related to the presentation, or search results for other client devices synchronized to the time offset. As another example, the interactive content may include an instant messaging interface (using any suitable chat or messaging protocol) that couples one or more other client devices to the client device. This may include client devices at about the same time within the presentation in order to provide a common contextual backdrop among the chat participants. This type of loose synchronization of chat participants can also be used to avoid detrimental user experiences where, for example, one participant temporally ahead of the others reveals and ending to a movie, television show, or sports event.

In one aspect, the synchronization platform may be used to impose synchronization on a second client device. Thus, for example, a first client device may be synchronized to a presentation, and a user of the first client device may invite one or more other client devices to participate in a synchronized view of the presentation. The explicit time offset for the first client device may be used to initiate one or more other presentations of the time-based media at remote locations so that other users can synchronously view the presentation and engage in interactive activity along with the user of the first client device.

As described above, the presentation may be any presentation that changes over time and, where an audio component is used for synchronization, any presentation having a suitable audio component (although non-audio synchronization is also possible). Thus, the presentation may include, by way of example and not limitation, a live television broadcast, a time-shifted television broadcast, a radio broadcast, and so forth. The presentation may be displayed from a pre-recorded media such as a CD, a DVD, a Blu-ray disc, and/or an HD DVD. The presentation may also or instead be rendered from a transmission received through a satellite transmission, a cable network, a data network, or any other suitable communication medium.

As shown in step 708, the client device may transmit an interaction with the interactive content. This may, for example, include submitting an answer to a quiz question, transmitting a response to a poll question, sending an instant message or other synchronous chat or text to other client devices, or submitting a search query including, e.g., one or more search terms. In another example, the interactive content may include an interface to a social networking platform such as FaceBook or Twitter where a communication to the platform automatically incorporates an identification of the user and a media title and time offset for the communication.

As shown in step 710, the client device may receive results of interaction by other client devices. Thus, for example, where the interactive content is a quiz, the client device may receive and display scores for other client devices including, e.g., top scores, average scores, median scores, and so forth. Where the interactive content is a poll, the client device may receive and display a result for the poll summarizing responses for other client devices.

Where the interactive content relates to searching, the client may receive and display actual search queries received from one or more other client devices at about the client device's current time offset within the presentation. Significantly, each one of the other client devices need not be at the same time offset at any particular moment in time. Rather, the other client devices may be at any time offset currently, or may not currently be synchronized to the presentation whatsoever. However, any searches from any one of the other client devices at a particular time offset (using any suitable units of time such as hours, minutes, seconds, or any other suitable time step) within the presentation may be captured and aggregated according to an independently determined time offset for that one of the other client devices. The aggregated, synchronized search results may then be processed for transmission to and display by the client device when the client device reaches that particular time offset. Search queries may be processed in a number of ways. For example, the search queries including, e.g., specific search terms or other search parameters may be ranked according to popularity. The search queries may also or instead be filtered by popularity, such as by displaying only the top five, top ten, or top twenty search queries.

The results of interaction may be windowed in any suitable manner. For example, where a client device is being actively quizzed or polled, the results for each question or other inquiry may be aggregated over some predetermined period, and the result may displayed for some period of time after the predetermined period. This may include displaying historical or aggregate results, such as a cumulative score for a quiz or a history of poll questions and results that have accumulated over the course of a time-based media presentation. For user-initiated content such as search activity, this may include a moving window such as plus/minus thirty seconds, one minute, five minutes, or the like. Similarly, for instant messaging applications or chat applications, participants may be limited to groups of devices having time offsets within a few seconds or minutes of one another. In addition, historical chat records may be available to time-shifted viewers.

More generally, as shown in step 712, the interactive content may be periodically updated as the time offset for the client device changes over an interval of the presentation. This may include dynamically updating any of the interactive content described above to reflect changes in related user behavior as the time offset for the client device changes. Examples of dynamic updating include adding or removing chat participants who are closer or farther respectively in time offset from the client device or updating a list of popular search queries (or selections of specific search results). This may also or instead include deterministically updating interactive content such as by explicitly progressing through poll or quiz questions as the time offset advances through a presentation for the client device. As another example, this may include updating paid or sponsored interactive content such as advertisements, market surveys, and so forth, any of which may be rendered as interactive content by a client device that is synchronized to a time-based media presentation.

In general, the process 700 may iterate by returning to any one of the proceeding steps. It will be understood that while a single process is depicted, the process 700 may be executed in parallel on any number of client devices, and that a single client device may in certain embodiments be synchronized to multiple input streams such as concurrent radio and television in a single venue. All such variations are intended to fall within the scope of this disclosure.

Figure 8:
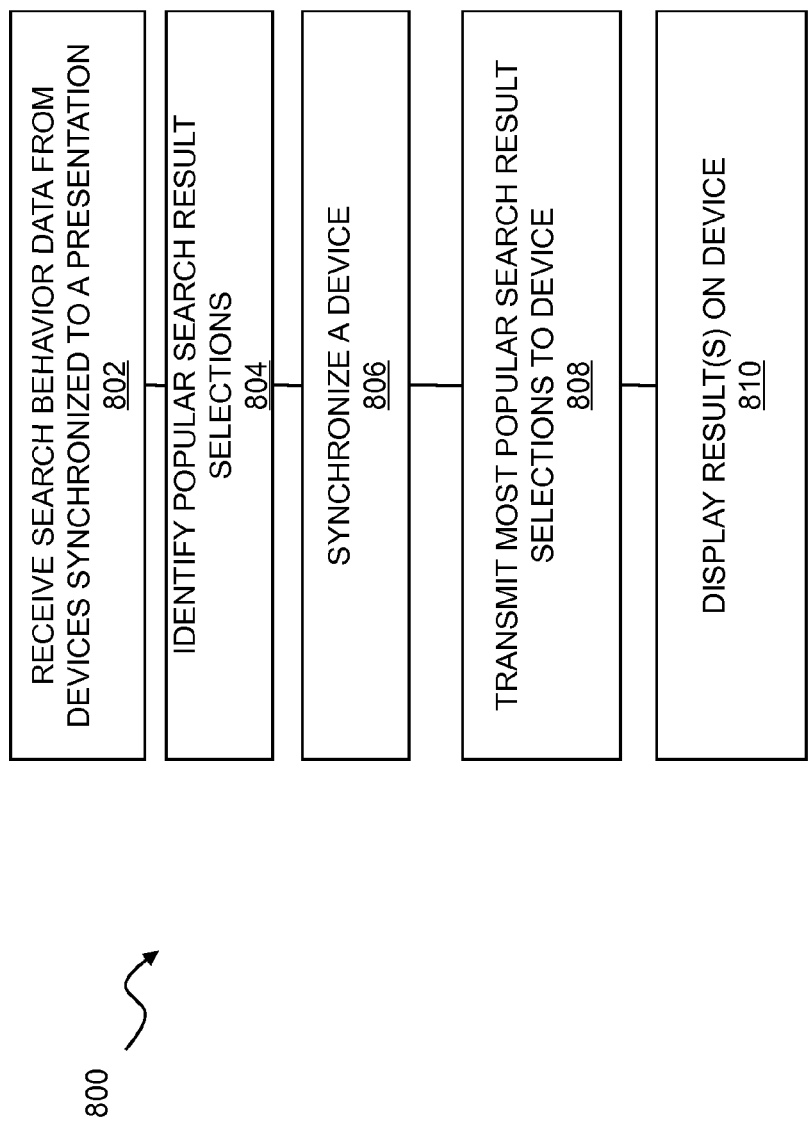
FIG. 8 is a flow chart of a process for sharing search activity from a number of synchronized devices.

FIG. 8 is a flow chart of a process 800 for sharing search activity from a number of synchronized devices. In general, this may be viewed as a more specific embodiment of delivering synchronized interactive content, particularly where the user interface on the synchronized device(s) permits user interaction with the shared search activity.

As shown in step 802, the process 800 may begin with receiving search behavior data from a number of tracked devices. The tracked devices may be synchronized to a first presentation of time-based media based upon an audio component of the first presentation, or using any other synchronization technique described above. It will be understood that the tracked devices may also or instead be synchronized to numerous instances of the time-based media, which may further include numerous asynchronous instances such as television broadcasts on different local networks, or in different time zones, or live and time-shifted views of a television broadcast. The search behavior data may include the content of search queries, and or the search behavior data may include search result selections. Thus, for example where a tracked device submits a search query while synchronized to a presentation, the search query may include a phrase or keywords used to search across content for responsive items using any suitable search technology. These search queries may be catalogued, correlated to a time offset within the presentation, and ranked or filtered by popularity or any other suitable metric (s). In one embodiment, the identity of a user may be used to weight new searches, such as where a particular user has a history of quick, initial selection of searches that later become popular.

In general, the tracked devices may be any of the devices described above, and synchronization may include synchronization using any of the techniques described herein. The first presentation may include any presentation through any media deliver platform described herein. In the context of FIG. 8, it should be further understood that the "first presentation" refers generally to any one or more presentations where search behavior is tracked and analyzed. Thus, for example, the first presentation may include multiple presentations, including live and/or time-shifted viewings as generally described above.

In one embodiment, search behavior data may include a search and a time offset from a number of client devices that are synchronized to an audio portion of a time-based media presentation. Each search may, for example, include a content query from one of the client devices, and each corresponding time offset may indicate a time within the time-based media presentation at which the search was submitted by the client device (or received by the server).

As shown in step 804, the process 800 may include identifying a most popular one of the search result selections at a time offset within the first presentation of the time-based media. In general, a server or the like may track not only queries received from tracked devices, but click-through or similar behavior that reflects specific search result selections by users. These selections may also be filtered, ranked (e.g., by popularity), or otherwise processed to identify popular search result selections. In particular, the most popular search result selected by users may be identified. More generally, step 804 may include generating an aggregated search result for all of the client devices, where the aggregated search result is synchronized to a specific time offset within the time-based media presentation.

As shown in step 806, a device may be synchronized with a second presentation of the time-based media. While synchronization to a time-shifted presentation is specifically contemplated, it will be understood that the methods and systems described herein may also be usefully employed exclusively in the context of a live broadcast using any server with adequate processing power and network connectivity to identify and distribute popular results within a small amount of time, such as within a few seconds, or even within a second. Thus the second presentation referred to herein may include an instance of the presentation that is concurrent with, or substantially concurrent with, the first presentation, and the process 800 described herein may usefully be performed exclusively in the context of a live broadcast. It will also be understood that a system is generally contemplated where the device and the tracked devices are synchronized to the time-based media presentation using the same synchronization technology (e.g., synchronization based on an audio component as discussed above), this is not an absolute requirement, and multiple synchronization techniques may be used across the various participating devices.

As shown in step 808, a representation of the most popular one of the search results may be transmitted to the device (synchronized in step 706) at about the time offset within the second presentation that the search behavior data was received from the first presentation. The representation of the most popular search result may take a variety of forms. This may include other data such as a listing of queries sorted by popularity, or a listing of search results sorted by popularity. In one aspect, the most popular search result may be highlighted within the listing of search results such as by displaying the most popular search result first, or by displaying the most popular search result in a separate (and prominent) area within a user interface. In one aspect, the process 800 may only return a link to the most popular search result, or may serve to the synchronized device the search result itself, e.g., in a browser or other content renderer. Thus the synchronized device may simply render popular results as they are identified, which permits a user to observe search activity by others without any interaction by the user. The most popular result may update at some interval such as once per minute or once per five minutes, or the most popular result may be updated immediately whenever a new, most popular result is identified. The interface may also provide usability enhancements, such as by disabling an updated of the result whenever a user initiated interaction with a particular result that is being displayed by the synchronized device.

In a more general embodiment, step 808 may include transmitting any aggregated search result to a (synchronized) receiving client device at a time within the time-based media presentation substantially corresponding to the specific time offset for which the aggregated search result was generated.

As shown in step 810, the result or results, once received by the synchronized device, may be displayed on a screen or other display hardware on the device.

The process 800 may be realized in a server or the like, such as any of the servers described above. It will be understood that the server may be distributed across multiple physical devices using known techniques, and may aggregate data from any number of client devices consistent with the communications and processing capabilities of the server. It will further be understood that a single logical or physical server may support the various steps described above for any number of different time-based media items such as different television programs, movies, and so forth. All such variations as would be apparent to one of ordinary skill in the art are intended to fall within the scope of this disclosure.

Figure 9:
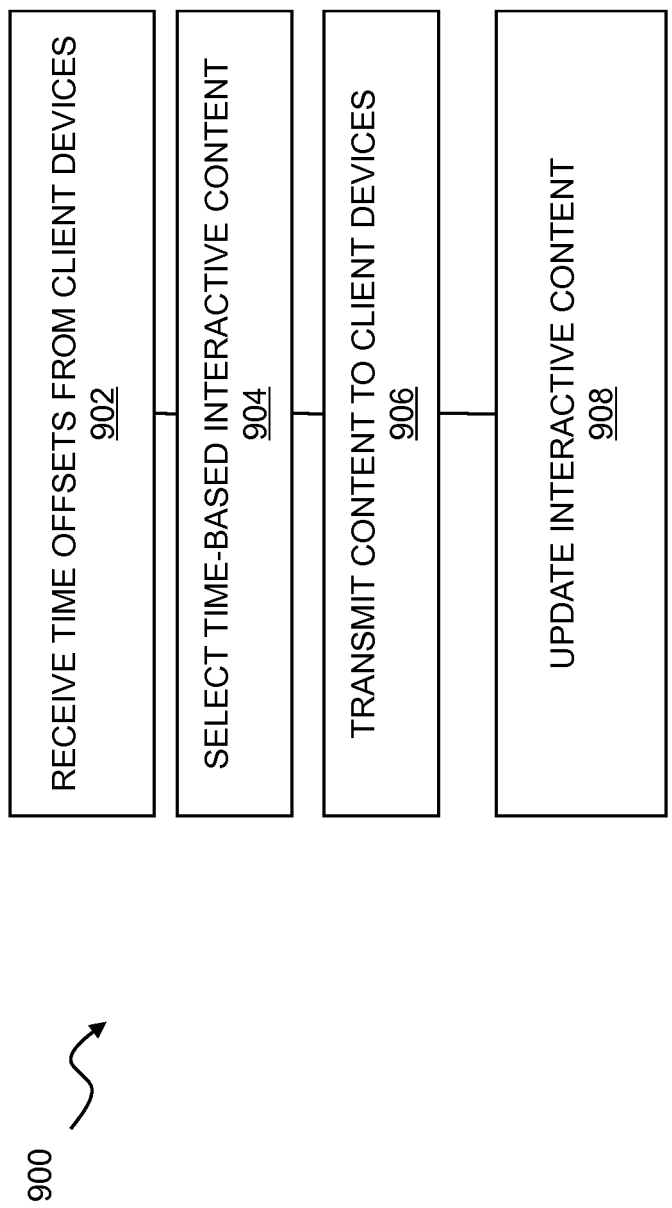
FIG. 9 is a flow chart of a process for delivering interactive content from a server to one or more synchronized client devices.

FIG. 9 is a flow chart of a process for delivering interactive content from a server to one or more synchronized client devices, such as with a server or similar hardware connected to a data network. In general, the process 900 of FIG. 9 may operate in a manner similar or identical to the process 800 described above with reference to FIG. 8, or in a manner complementary to the process 700 for operating a client device described above with reference to FIG. 7. As will be readily apparent, the process 900 of FIG. 9 relates more generally to delivering interactive content synchronized to multiple, asynchronous instances of a time-based media presentation.

As shown in step 902, the process 900 may begin with receiving a number of time offsets from a number of client devices that identify a temporal location in a presentation of time-based media for each one of the plurality of client devices. The client devices may be synchronized using, e.g., any of the synchronization techniques described above or any other suitable technique. The time offsets may be in any suitable units including hours/minutes/seconds, or some other time steps or increments useful for tracking progress through time-based media. The presentation may be any of the time-based media presentations described above.

As shown in step 904, the process 900 may include selecting time-based interactive content for each one of the client devices according to the temporal location in the presentation for that client device. The time-based interactive content may, for example, include a quiz related to the presentation, or a poll or audience feedback query temporally related to the presentation. As described above, the time-based interactive content may also or instead include a display of search queries from one or more of the client devices that have been synchronized to the presentation, with each one of the search queries synchronized to the presentation according to an independently determined time offset for each respective one of the client devices.

The interactive content may also or instead include data derived from previous interactions by client devices. Thus, for example, the process 900 may include scoring responses to a quiz and transmitting a quiz result (e.g., an individual or aggregate score) to one or more of the client devices. Similarly, the process 900 may include processing poll responses and transmitting a result for a poll to the client devices. The interactive content may also or instead include an instant messaging interface using any suitable messaging technology that couples the plurality of client devices in a communicating relationship for synchronous chat or the like. The interactive content may also or instead include a display of search queries as discussed above. This may for example include search queries from one or more of the client devices that have been synchronized to the presentation, and each one of the search queries may be individually synchronized to the presentation according to an independently determined time offset for a corresponding one of the plurality of client devices. The search queries may be ranked and/or filtered according to popularity, and as described above, specific search results may be ranked and/or filtered according to their selection by users.

As shown in step 906, the process 900 may include transmitting the time-based interactive content to at least one of the plurality of client devices. This may include calculating and transmitting a presentation offset to one or more of the client devices. Thus, for example, where numerous client devices are synchronized to approximately but not exactly concurrent instances of the presentation, the interactive content may be broadcast with an indication of the correct time offset to render the interactive content. Each client device may then use its own time offset data to autonomously determine when to render the interactive content.

As shown in step 908, the process 800 may include updating the interactive content for each one of the devices as the time offset changes over an interval of the presentation. Thus, for example, search behavior, poll results, quiz scores, and the like may be dynamically updated with the passage of time, or participants to a chat session may be added or removed as time offsets change for different devices. The updating may also or instead include periodic presentations of sponsored content, informational messages from a content provider, or any other predetermined or dynamic content that might usefully be synchronized to the presentation. In another aspect, content such as sponsored content may be selected according to aggregate search behavior such as a most popular search result selected by users.

Figure 10:
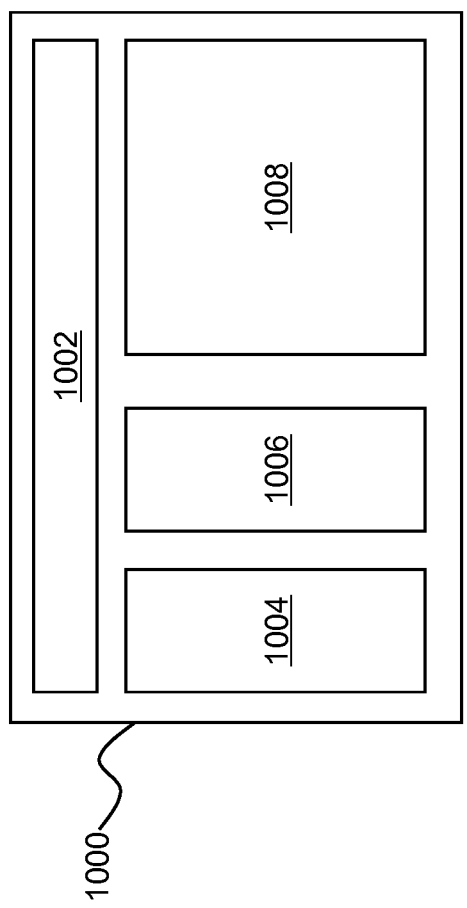
FIG. 10 shows a user interface for rendering interactive content on a client device.

FIG. 10 shows a user interface for rendering interactive content on a client device as described herein. In general, interactive content such as chat, polling, user feedback, and the like may be rendered in any suitable format. Where interactive content such as search activity includes multiple layers or dimensions of information, this information may be usefully displayed in a progressive format that provides a combination of general and specific information.

As shown in FIG. 10, a user interface 1000 may include a status window 1002, a search query window 1004, a search results window 1006, and a most popular result window 1008. The windows 1002, 1004, 1006, 1008 may be windows, frames, panes, or other elements of a web-based user interface, or any other suitable interface element(s) and or controls, which may be rendered on a touch screen or other display of a client device such as any of the client devices described above.

The status window 1002 may display various status items for a current device synchronization. This may, for example, a title of media such as a movie or television broadcast to which the device is synchronized. This may also include a synchronization status that indicates whether there is currently good synchronization to the media. This may be displayed textually, or graphically with an icon or other symbol showing, e.g., red, yellow, or green to indicate no synchronization, interrupted synchronization, or current synchronization respectively. The status window 1002 may also display a current time offset within the media (when synchronized), media control icons such as paused, playing, stopped, and the like, as well as any other useful information. The status window 1002 may also include fields for user input such as a search query originated from the client device or a text message or the like from the client device.

The search query window 1004 may display search queries from other devices that correspond to the current offset for the client device. Thus, a user may view contemporaneous search activity indexed to the time offset regardless of any actual time-shifting in the media presentation to the client device. The search queries may be ranked or filtered by popularity, which ranking/filtering may be updated at any suitable intervals. With a large number of participants, it is expected that actual popularity will change slowly over time; however if actual user behavior deviates significantly from this norm other processing steps can be taken so that the list displayed on the client device remains sufficiently stable for easy viewing by a user. Actual search queries may be pre-processed for consistency, such as by changing the order of keywords or disambiguating words with multiple possible meanings (e.g., according to other keywords in a query, or according to known content of the media at the relevant time offset).

The search result window 1006 may display search results for a most popular one of the search queries. The search results may be ranked and/or filtered by relevance or popularity using any techniques known in the art, and may for example be obtained through an application programming interface for a third party search engine or from any other suitable source. The search results may be displayed as a textual list of hyperlinks, as small or large icons, or as separate interactive tiles that may each include several actively hyperlinked areas therein. This latter approach may be particularly suitable where, for example, a result is a particular good such as a DVD or other media. In such a case, the interactive tile may include, e.g., separate areas within the tile linked to biographical information about the media, linked to web sites where the media can be purchased, linked to clips or promotional videos for the media, and so forth.

The most popular result window 1008 may display a single, most popular search result selected from the search results of the search result window 1006. Particularly where searching is performed through the synchronization platform described herein (which searching may receive back end support from a third party search platform), selection of individual search results from synchronized client devices may be tracked, and the most popular search result that is actually selected may be presented directly to any/all synchronized client devices. This approach advantageously permits a user to view, with no keystrokes whatsoever, the item that is being selected by most client devices synchronized to a time-based media presentation. This service can converge fairly quickly, and may be provided in near real time to viewers of a live broadcast, as well as to any time-shifted viewers independent of when and where the presentation is viewed. In one embodiment, the client device may display only the most popular result window 1008, which may be rendered as a link to the most popular item, or as the most popular item itself.

It will be appreciated that many of the above systems, devices, methods, processes, and the like may be realized in hardware, software, or any combination of these suitable for the data processing, data communications, and other functions described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

In other embodiments, disclosed herein are computer program products comprising computer-executable code or computer-usable code that, when executing on one or more computing devices (such as the devices/systems described above), performs any and/or all of the steps described above. The code may be stored in a computer memory or other non-transitory computer readable medium, which may be a memory from which the program executes (such as internal or external random access memory associated with a processor), a storage device such as a disk drive, flash memory or any other optical, electromagnetic, magnetic, infrared or other device or combination of devices. In another aspect, any of the processes described above may be embodied in any suitable transmission or propagation medium carrying the computer-executable code described above and/or any inputs or outputs from same.

It will be appreciated that the methods and systems described above are set forth by way of example and not of limitation. Numerous variations, additions, omissions, and other modifications will be apparent to one of ordinary skill in the art. While particular embodiments of the present invention have been shown and described, it will be apparent to those skilled in the art that various changes and modifications in form and details may be made therein without departing from the spirit and scope of the invention as defined by the following claims. The claims that follow are intended to include all such variations and modifications that might fall within their scope, and should be interpreted in the broadest sense allowable by law.

What is claimed is:

1. A method comprising:
   receiving a plurality of time offsets from a plurality of client devices that identify a temporal location in a presentation of time-based media for each one of the plurality of client devices;
   transmitting time-based interactive content selected according to the temporal location to at least one of the plurality of client devices for display on the at least one of the plurality of client devices, wherein the interactive content includes a quiz synchronized to the presentation;
   scoring one or more responses to the quiz from the plurality of client devices; and
   transmitting a quiz result based upon the scoring to one of the plurality of clients for display on the one of the plurality of client devices synchronized to the presentation according to an independently determined time offset for the one of the plurality of client devices.

2. The method of claim 1 wherein transmitting time-based interactive content includes transmitting a presentation offset in order to synchronize display of the time-based interactive content on each one of the plurality of client devices.

3. The method of claim 1 wherein the interactive content includes a poll temporally related to the presentation.

4. The method of claim 3 further comprising transmitting a result for the poll to one or more of the plurality of client devices.

5. The method of claim 1 further comprising updating the interactive content for each one of the plurality of devices as the time offset for that one of the plurality of devices changes over an interval of the presentation.

6. The method of claim 1 wherein the presentation includes a live television broadcast.

7. The method of claim 1 wherein the presentation includes a time-shifted television broadcast.

8. The method of claim 1 wherein the presentation includes a display to the client device from a pre-recorded media including at least one of a CD, a DVD, a Blu-ray disc, and an HD DVD.

9. The method of claim 1 wherein synchronizing the client device includes:
   receiving data representative of an audio component of the presentation from each one of the plurality of client devices;
   determining for each one of the plurality of client devices a time offset within the presentation; and
   transmitting the time offset for each one of the plurality of client devices to that one of the plurality of client devices.

10. The method of claim 1 wherein the interactive content includes an instant messaging interface that couples the plurality of client devices in a communicating relationship for synchronous chat.

11. A computer program product for providing interactive content, the computer program product comprising computer executable code embodied in a non-transitory computer readable medium that, when executing on one or more computing devices, performs the steps of:

receiving a plurality of time offsets from a plurality of client devices that identify a temporal location in a presentation of time-based media for each one of the plurality of client devices;

transmitting time-based interactive content according to the temporal location to at least one of the plurality of client devices for display on the at least one of the plurality of devices, wherein the interactive content includes a quiz synchronized to the presentation;

scoring one or more responses to the quiz from the plurality of client devices; and transmitting a quiz result based upon the scoring to one of the plurality of clients for display on the one of the plurality of client devices synchronized to the presentation according to an independently determined time offset for the one of the plurality of client devices.

12. The computer program product of claim 11 wherein transmitting time-based interactive content includes transmitting a presentation offset in order to synchronize display of the time-based interactive content on each one of the plurality of client devices.

13. A server comprising:

a data network interface configured to provide a communicating relationship with a data network;

a database; and a processor configured to perform the steps of:

receiving a plurality of time offsets from a plurality of client devices that identify a temporal location in a presentation of time-based media for each one of the plurality of client devices;

transmitting time-based interactive content from the database according to the temporal location to at least one of the plurality of client devices for display on the at least one of the plurality of devices, wherein the interactive content includes a quiz synchronized to the presentation;

scoring one or more responses to the quiz from the plurality of client devices; and transmitting a quiz result based upon the scoring to one of the plurality of clients for display on the one of the plurality of client devices synchronized to the presentation according to an independently determined time offset for the one of the plurality of client devices.

14. The computer program product of claim 11 wherein the interactive content includes a poll temporally related to the presentation.

15. The computer program product of claim 11 further comprising code that performs the step of transmitting a result for the poll to one or more of the plurality of client devices.

16. The computer program product of claim 11 further comprising code that performs the step of updating the interactive content for each one of the plurality of devices as the time offset for that one of the plurality of devices changes over an interval of the presentation.

17. The computer program product of claim 11 wherein the presentation includes a live television broadcast.

18. The computer program product of claim 11 wherein the presentation includes a time-shifted television broadcast.

19. The computer program product of claim 11 wherein the presentation includes a display to the client device from a pre-recorded media including at least one of a CD, a DVD, a Blu-ray disc, and an HD DVD.

* * * * *